Patented Aug. 9, 1932

1,870,359

UNITED STATES PATENT OFFICE

HENRY CHRISTIAN LOUIS DUNKER, OF HELSINGBORG, SWEDEN

METHOD OF MAKING GALOSHES, SHOES WITH RUBBER SOLES OR THE LIKE BY PRESSING

No Drawing. Application filed August 12, 1929, Serial No. 385,464, and in Germany July 19, 1929.

It is known to manufacture galoshes, seaside shoes and other foot-wear with rubber soles and with total or partial rubber covering on the sides of the shoe by means of a press or press machine which has a movable sole mould as well as two side moulds movable on the table of the machine and a removable last at the centre of the table. Outside the press the last is covered with layers of fabric and rubber, and the covered last is inserted in the press, whereupon the movable side moulds and the movable sole mould are assembled around the covered last with the result that the heated outer moulds first make the rubber flow owing to the heat and pressure and secondly cause a complete vulcanization of the rubber contained in the form-giving parts of the outer moulds (the assembled galosh or the rubber bottom part of the shoe). By this method the final vulcanization of the rubber parts of the shoes is carried out, as above stated, by the heat from the heated moulds, and it is, therefore, necessary to keep the outer moulds assembled around the shoe on the last until the vulcanization has been completed. In order to avoid the inconvenience of using the whole machine with the last and outer moulds not only for the pressing of the shoes or the like but also for the final vulcanization thereof, it has been proposed to press the rubber foot-wear in the press by means of a preliminary last and to give it only a mere provisional vulcanization in the press so that the shoes cohere sufficiently to be placed on a finishing last giving them the final and correct shape and on which the shoes may thereafter be finished by vulcanization outside the press. This method has among others the disadvantage that the rubber parts of the shoes are subject to change of shape after being pressed and inserted on the finishing last, so that the surface does not get the fine appearance aimed at by machine manufacture. Furthermore, it is of course a defect that the foot-wear which is only partially vulcanized must be stretched in order to be inserted on the finishing last, the coherence between the individual layers of fabric and rubber being often broken thereby. The placing of the shoes on the finishing last necessitates also the employment of particularly elastic fabric layers in the shoe or galosh. Instead of using a preliminary last and a finishing last it has, therefore, been preferred to use the press as a vulcanizing machine either, as first stated, for so long a period that the rubber shoes were fully vulcanized or at all events for so long a time that the vulcanization was sufficient to fix the shape of the shoe, at least outwardly, so that thereafter the last might be removed from the press with the shoe thereon (fixed in regard to the outer shape) and the vulcanization might be finished outside the press with the shoe still on the press last. The advantage of this procedure is that the press is only occupied during the period necessary to the pressing itself, a comparatively short pressing period being sufficient to pre-vulcanize or fix (as to the shape) the shoe to the extent that it may be finished as to vulcanization outside the press remaining on the press last in a well known manner by heating it in vulcanizing furnaces. The said method involves great progress in economy compared with the prior methods, but has, however, the disadvantage that the shoe must remain on the press last until the vulcanization has been completed in the furnace. This means that a great number of lasts must be employed in each press, and the better economy obtained by the method thus comprises only a more economical use of the pressing machine and the outer moulds. The present invention relates to a method by which the pressing machine and the outer moulds are utilized as economically or almost as economically as by the above described method, but where the employment of the great number of lasts is avoided, the number of lasts required for one machine being reduced to four to six. Such a number of lasts is the minimum required, when a last fully covered e. g. with a vulcanized inner shoe, a "lining portion", and with an outer rubber covering is always to be ready for insertion in the press as soon as the latter has finished the pressing, whereupon a last is placed in the press. As of course some time is required to remove the pressed shoe from the last just removed from the press, it must be calculated that one or two lasts are in the hands of the operator removing the last from the machine and the shoe from the last in order to relieve the latter to enter again into the circuit (i. e. covering of the last, inserting it in the press in connection with the pressing process and finally the removal of the last from the press and of the shoe from the last). The main characterizing feature of the present method as compared with the above described prior art methods is that the heated outer moulds are only kept assembled around the last in the press for a period which is comparatively short although sufficiently long to not only give the required outer shape to the rubber portions of the shoe but also so pre-vulcanize them between the heated moulds that the shoe has its absolutely definitive shape, so that the final vulcanization may take place not only outside the press (as is formerly known) e. g. in the vulcanizing furnace but also without occupying the press last, so that this last may soon again be employed in the press. By properly selecting the pressure in the press, the speed of the moulds and their temperature together with the length of the pressing and pre-vulcanizing period proper the pressing and pre-vulcanizing to definitive shape may be ensured to be carried out so rapidly that only four to six lasts are required for each press, as stated above. A rapid pre-vulcanizing may also be ensured by suitable additions to the rubber and by previous partial vulcanization of the rubber parts to any considerable thickness found in the shoe. As the lasts are only occupied for actual use in connection with the press, and as the finish of vulcanization of the shoes coming from the press with their definitive shape may be carried out in the air or in other known manner, the method means an economical utilization of the press and the small number of lasts belonging thereto, and at the same time the product is not subject to any finish in shaping outside the press but retains, on the contrary, the shape with which it leaves the press. The main aim of the present method is not to take the shoe from the press or remove it from the press last before it has taken its definitive shape while placed on the press last and enclosed in the outer moulds. It is, therefore, not necessary to employ any last for supporting the shoe during the vulcanization outside the press. The shoe pressed to its definitive shape is finished in vulcanization normally by only being suspended or set on a conveying device carrying the shoes through a heated vulcanizing chamber. Of course, the suspending devices carrying the shoes through the said chamber may be so shaped that they keep to a certain degree the shoes in their shape, but these measures are unnecessary as the shoe leaves the press (pressing last) in definitive shape. As cardboard stiffeners are often inserted in the shoes for shipment and packing in boxes later on, it is a matter of course that these or other stiffeners may be inserted in the shoes upon their leaving the press last and going to the vulcanizing furnace.

I claim:—

1. A method of pressing galoshes, rubber footwear or the like with wholly rubber-covered sides, consisting in covering a last with lining fabric, covering the said lining on the last with pieces of unvulcanized rubber, inserting the last thus ready built for pressing between heated outer press molds in a pressing machine and moving said outer molds together about the covered last, so that the rubber in the covering of the last is pressed and pre-vulcanized, the outer molds being kept tight together until the pressed rubber footwear is pre-vulcanized to definitive shape while on the press last and enclosed by the outer molds, removing said molds from the last, removing the pressed and pre-vulcanized footwear from the press last and finally further treating and finishing the vulcanization of the article outside the press and without the footwear needing to be supported by any last preventing deformation.

2. A method of pressing bathing shoes or similar kinds of rubber footwear with partially rubber-covered sides, consisting in covering the sole portion of a last with lining fabric, covering the sides of the last with a canvas cover corresponding to the canvas portion of a bathing shoe, covering the sole portion of the last and those portions of the canvas cover which are to be rubber-covered with suitable pieces of unvulcanized rubber, inserting the last thus ready built for pressing between heated outer press molds in a pressing machine, moving said outer molds together about the covered last, so that the rubber in the covering of the last is pressed and pre-vulcanized, maintaining the outer molds tight together until the pressed rubber underpart of the bathing shoe is pre-vulcanized to definitive shape while on the press last and enclosed by the outer molds, removing these molds from the last and removing the footwear, of which the rubber portion is pressed and pre-vulcanized to definitive shape from the press last and finally further treating and finishing the vulcanization outside the press and without the footwear needing to be supported by any last preventing deformation.

3. The herein described method of manufacturing footwear being in part at least of rubber, which consists in covering a last with elements to form the interior of the finished footwear, covering the outside of the said elements with not previously shaped pieces of unvulcanized rubber, thereafter subjecting the rubber parts on the last to a hot moulding pressure of short but sufficient duration to prevulcanize the footwear on the last to its correct shape whereby the article takes on and holds its finished shape, removing the article from the last, and finally vulcanizing the said rubber parts apart from the last.

4. The method of manufacturing footwear, as claimed in claim 3, in which the final step of completely vulcanizing the rubber parts consists in conveying the article from the last and in the presence of a vulcanizing agent.

In testimony whereof I affix my signature.

HENRY CHRISTIAN LOUIS DUNKER.